(12) United States Patent
Keisler et al.

(10) Patent No.: US 10,177,360 B2
(45) Date of Patent: Jan. 8, 2019

(54) BATTERY SEPARATORS WITH CONTROLLED PORE STRUCTURE

(71) Applicant: Hollingsworth & Vose Company, East Walpole, MA (US)

(72) Inventors: Randall B. Keisler, Clifton Park, NY (US); Maxim Silin, Hudson, MA (US); John A. Wertz, Hollis, NH (US)

(73) Assignee: Hollingsworth & Vose Company, East Walpole, MA (US)

( * ) Notice: Subject to any disclaimer, the term of this patent is extended or adjusted under 35 U.S.C. 154(b) by 11 days.

(21) Appl. No.: 14/550,413

(22) Filed: Nov. 21, 2014

(65) Prior Publication Data

US 2016/0149183 A1    May 26, 2016

(51) Int. Cl.
*H01M 2/16* (2006.01)
*H01M 10/12* (2006.01)

(52) U.S. Cl.
CPC .......... *H01M 2/1613* (2013.01); *H01M 10/12* (2013.01)

(58) Field of Classification Search
CPC ............................ H01M 2/1613; H01M 10/12
See application file for complete search history.

(56) References Cited

U.S. PATENT DOCUMENTS

| | | |
|---|---|---|
| 3,907,604 A | 9/1975 | Prentice |
| 3,947,537 A | 3/1976 | Buntin et al. |
| 4,207,367 A | 6/1980 | Baker |
| 4,216,280 A | 8/1980 | Igarashhi et al. |
| 4,279,979 A | 7/1981 | Benson et al. |
| 4,414,295 A | 11/1983 | Uba |
| 4,465,748 A | 8/1984 | Harris |
| 4,481,241 A | 11/1984 | Kawashima et al. |
| 4,540,414 A | 9/1985 | Wishman |
| 4,891,262 A | 1/1990 | Nakamae et al. |
| 5,080,951 A | 1/1992 | Guthrie |
| 5,091,275 A | 2/1992 | Brecht et al. |
| 5,180,647 A | 1/1993 | Rowland et al. |
| 5,281,498 A | 1/1994 | Muto et al. |
| 5,468,572 A | 11/1995 | Zguris et al. |
| 5,494,736 A | 2/1996 | Willey et al. |
| 5,622,776 A | 4/1997 | Esu |

(Continued)

FOREIGN PATENT DOCUMENTS

| | | |
|---|---|---|
| CN | 1168543 A | 12/1997 |
| CN | 200962440 Y | 10/2007 |

(Continued)

OTHER PUBLICATIONS

U.S. Appl. No. 15/018,931, filed Feb. 9, 2016, Ashirgade et al.

(Continued)

*Primary Examiner* — Michael L Dignan
(74) *Attorney, Agent, or Firm* — Wolf, Greenfield & Sacks, P.C.

(57) ABSTRACT

Disclosed are battery separators comprising glass fibers and having a basis weight (gsm), a specific surface area (m²/g), a density (gsm/mm) and a mean pore size (μm), which satisfy the equation disclosed herein, provided that: the specific surface area is less than 1.5 m²/g, or the density is greater than 180 gsm/mm. Also disclosed are batteries comprising the battery separators, and processes for making the separators.

16 Claims, 4 Drawing Sheets

(56) References Cited

U.S. PATENT DOCUMENTS

| | | | |
|---|---|---|---|
| 5,972,500 | A | 10/1999 | Gross et al. |
| 5,989,750 | A | 11/1999 | Ohba et al. |
| 6,071,641 | A | 6/2000 | Zguris |
| 6,108,879 | A * | 8/2000 | Forte .................. D04H 13/005 28/104 |
| 6,143,441 | A | 11/2000 | Zguris et al. |
| 6,306,539 | B1 | 10/2001 | Zguris |
| 6,391,444 | B1 | 5/2002 | Kielmeyer |
| 6,495,286 | B2 * | 12/2002 | Zguris .................. H01M 2/1613 429/142 |
| 6,495,292 | B1 | 12/2002 | Yen |
| 6,509,118 | B1 | 1/2003 | Pavlov et al. |
| 6,537,695 | B2 | 3/2003 | McLoughlin et al. |
| 6,537,935 | B1 | 3/2003 | Seth et al. |
| 6,641,902 | B1 | 11/2003 | Kobayashi et al. |
| 6,777,056 | B1 | 8/2004 | Boggs et al. |
| 6,869,726 | B2 | 3/2005 | Zucker |
| 6,929,858 | B2 | 8/2005 | Zguris et al. |
| 7,159,805 | B2 | 1/2007 | Reher et al. |
| 7,288,338 | B2 | 10/2007 | Zguris |
| 7,645,490 | B2 | 1/2010 | Bush et al. |
| 7,790,240 | B2 | 9/2010 | Zheng |
| 8,592,329 | B2 | 11/2013 | Coon et al. |
| 9,293,748 | B1 | 3/2016 | Ashirgade et al. |
| 9,577,236 | B2 | 2/2017 | Ashirgade et al. |
| 9,627,668 | B1 | 4/2017 | Ashirgade et al. |
| 9,728,756 | B2 | 8/2017 | Ashirgade et al. |
| 9,786,885 | B2 | 10/2017 | Jiang |
| 2003/0022068 | A1 | 1/2003 | Pekala |
| 2003/0054232 | A1* | 3/2003 | Zucker ................ H01M 2/1666 429/144 |
| 2003/0054235 | A1 | 3/2003 | Zucker |
| 2003/0054236 | A1 | 3/2003 | Zucker |
| 2003/0175593 | A1 | 9/2003 | Chen et al. |
| 2008/0299462 | A1 | 12/2008 | Whear et al. |
| 2009/0155603 | A1 | 6/2009 | Zheng et al. |
| 2011/0143184 | A1 | 6/2011 | McCarthy et al. |
| 2011/0217583 | A1 | 9/2011 | Sugiyama et al. |
| 2012/0070728 | A1 | 3/2012 | Wertz et al. |
| 2012/0070729 | A1* | 3/2012 | Wertz .................... C03C 3/064 429/188 |
| 2012/0121975 | A1 | 5/2012 | Rajaram et al. |
| 2012/0295165 | A1 | 11/2012 | Morin et al. |
| 2013/0071723 | A1 | 3/2013 | Wertz et al. |
| 2013/0071734 | A1 | 3/2013 | Wertz et al. |
| 2013/0071735 | A1 | 3/2013 | Wertz et al. |
| 2013/0224632 | A1 | 8/2013 | Roumi |
| 2014/0227585 | A1 | 8/2014 | Wertz et al. |
| 2014/0272535 | A1* | 9/2014 | Clement ............. H01M 2/1613 429/145 |
| 2016/0079581 | A1 | 3/2016 | Ashirgade et al. |
| 2016/0164058 | A1 | 6/2016 | Ashirgade et al. |
| 2016/0301053 | A1 | 10/2016 | Jiang |
| 2017/0092917 | A1 | 3/2017 | Ashirgade et al. |
| 2017/0170442 | A1 | 6/2017 | Ashirgade et al. |
| 2017/0179454 | A1 | 6/2017 | Natesh et al. |
| 2017/0294639 | A1 | 10/2017 | Natesh |
| 2017/0373293 | A1 | 12/2017 | Jiang |
| 2018/0026247 | A1 | 1/2018 | Ashirgade et al. |
| 2018/0047964 | A1 | 2/2018 | Natesh et al. |

FOREIGN PATENT DOCUMENTS

| | | | |
|---|---|---|---|
| CN | 201194241 | Y | 2/2009 |
| CN | 201450040 | U | 5/2010 |
| CN | 102169974 | A | 8/2011 |
| CN | 103094516 | A | 5/2013 |
| EP | 0 044 868 | B1 | 11/1984 |
| EP | 0 515 105 | A2 | 11/1992 |
| EP | 0 528 473 | A2 | 2/1993 |
| EP | 0 949 705 | A2 | 10/1999 |
| EP | 1 585 182 | A1 | 10/2005 |
| EP | 1 617 495 | A1 | 1/2006 |
| EP | 1 816 258 | A1 | 8/2007 |
| EP | 2 538 471 | A1 | 12/2012 |
| JP | S61-128459 | A | 6/1986 |
| JP | H02-049348 | A | 2/1990 |
| JP | H06-295718 | A | 10/1994 |
| JP | H07-161342 | A | 6/1995 |
| JP | H07-201310 | A | 8/1995 |
| JP | H08-195194 | A | 7/1996 |
| JP | H09-134716 | A | 5/1997 |
| JP | 2002-298816 | A | 10/2002 |
| JP | 2002-313305 | A | 10/2002 |
| JP | 2003-017030 | A | 1/2003 |
| JP | 2003-242953 | A | 8/2003 |
| JP | 2003-297328 | A | 10/2003 |
| JP | 2003-297329 | A | 10/2003 |
| JP | 2008-243636 | A | 10/2008 |
| KR | 820001508 | B1 | 8/1982 |
| WO | WO98/00875 | * | 1/1998 ............. H01M 2/16 |
| WO | WO 99/01902 | A1 | 1/1999 |
| WO | WO 2010/127056 | A1 | 11/2010 |
| WO | WO 2012/040395 | A2 | 3/2012 |

OTHER PUBLICATIONS

PCT/US2015/061449, Jan. 27, 2016, International Search Report and Written Opinion.
International Search Report and Written Opinion for Application No. PCT/US2015/061449 dated Jan. 27, 2016.
Turbak, Nonwovens: Theory, Process, Performance, and Testing. Tappi Press 1993. Excerpt pp. 144-147.
Zguris et al., Nonwovens Battery Separators to improve performance in lead acid battery systems. Mabat Conference. Warsaw, Poland. Jul. 24, 1991.
U.S. Appl. No. 13/834,597, filed Mar. 15, 2013, Clement et al.
U.S. Appl. No. 14/259,415, filed Apr. 23, 2014, Wertz et al.
U.S. Appl. No. 13/329,273, filed Sep. 21, 2011, Wertz et al.
U.S. Appl. No. 14/486,459, filed Sep. 15, 2014, Ashirgade et al.
U.S. Appl. No. 14/683,565, filed Apr. 10, 2015, Jiang.
U.S. Appl. No. 15/127,057, filed Sep. 19, 2016, Natesh.
U.S. Appl. No. 15/378,971, filed Dec. 14, 2016, Ashirgade.
U.S. Appl. No. 15/359,902, filed Nov. 23, 2016.
U.S. Appl. No. 15/380,990, filed Dec. 15, 2016.
U.S. Appl. No. 15/552,328, filed Aug. 21, 2017, Natesh et al.
U.S. Appl. No. 15/510,339, filed Mar. 10, 2017, Natesh.
U.S. Appl. No. 15/642,588, filed Jul. 6, 2017, Ashirgade et al.
U.S. Appl. No. 15/647,327, filed Jul. 12, 2017, Jiang.
U.S. Appl. No. 15/839,810, filed Dec. 12, 2017, Clement et al.
Zguris, A review of physical properties of separators for valve-regulated lead/acid batteries. Journal of Power Sources. 1996;59:131-5.

* cited by examiner

Acid Stratification Apparatus

BATTERY SEPARATORS WITH CONTROLLED PORE STRUCTURE

BACKGROUND

Batteries are commonly used as energy sources. Typically, a battery includes a negative electrode and a positive electrode. The negative and positive electrodes are often disposed in an electrolytic medium. During discharge of a battery, chemical reactions occur wherein an active positive electrode material is reduced and active negative electrode material is oxidized. During the reactions, electrons flow from the negative electrode to the positive electrode through a load, and ions in the electrolytic medium flow between the electrodes. To prevent direct reaction of the active positive electrode material and the active negative electrode material, the electrodes are mechanically and electrically isolated from each other by a separator.

One type of battery is a lead-acid battery. In a lead acid battery, lead is usually an active negative electrode material, and lead dioxide is usually an active positive electrode material. (In a lead-acid battery, the electrodes are often referred to as "plates".) Generally, lead acid batteries also contain sulfuric acid, which serves as an electrolyte and participates in the chemical reactions.

A mat comprised of glass fibers may serve as a separator. The glass mat separator has a critical role in electrolyte filling. Changes in the physical properties of this material may have an impact on the quality of the filled and formed battery. The separator structure, including its fiber composition, may influence how well an unfilled element will accept electrolyte, sustainment of pressure or force on the internal cell components, as well as certain attributes of battery performance.

When electrolyte is added to the battery, the ideal situation is that all areas are wetted as much as possible by the same amount and concentration of acid so that there is perfectly uniform distribution of electrolyte throughout the plate stack when the filling process is completed. This ideal situation is difficult or impossible to achieve in practice, as there is a dynamic competition between the separator and the plate surfaces for the electrolyte. As the electrolyte penetrates into the plate stack, it is held up by the separator (the capillary forces tend to hold the electrolyte rather strongly), and at the same time the electrolyte is depleted by the exothermic reaction of the sulfuric acid with the plate by the simple chemical reaction of $PbO + H_2SO_4 \Rightarrow PbSO_4 + H_2O$. As the liquid front penetrates deeper into the stack it becomes more dilute and also gets hotter, due to the exothermic reaction with the lead oxide. As the acid reacts with the lead oxide, the sulfuric acid electrolyte becomes progressively more dilute. Lead sulfate is relatively soluble in the hot electrolyte with low acid strength and near neutral pH, and dissolved lead sulfate will diffuse into the separator. This will hasten the formation of lead dendrites in the separator and/or hydration shorts. A short circuit may develop and be detected during formation, or more subtly the battery will fail prematurely in service due to the formation of lead dendrites penetrating the structure and short circuiting the positive and negative plates. If the filling process is poor or incomplete, individual cells may also have "dry areas" after filling. These poorly wetted areas may include no acid or water (completely dry), dilute acid or just water. These dry areas will slowly become wetted during and after formation, but significant grid corrosion may result due to unformed active material forcing all of the current to flow through the grid only.

During discharge, the sulfuric acid in the electrolyte is consumed and water is produced, diluting the acid concentration and causing the specific gravity of the electrolyte to decrease. During charging, formation of lead and lead dioxide in the negative and positive plates, respectively, results in release of pure sulfuric acid. Due to its high specific gravity, the pure sulfuric acid tends to settle toward the bottom (or "stratify", creating layers) in the electrolyte, a phenomenon known as "acid stratification". In a stratified battery, electrolyte concentrates at the bottom, starving the upper part of the cell. The light acid on top limits plate activation, promotes corrosion and reduces the performance, while the high acid concentration on the bottom creates heavy sulfation and large crystals reducing battery performance.

Unfortunately, design or materials changes that improve certain performance attributes can negatively affect other performance attributes and/or increase cost.

SUMMARY

There is a need for a battery separator that can balance certain performance attributes while not significantly negatively affecting other performance attributes and/or increasing cost. For example, coarser fibers (i.e., having a larger average diameter) are generally less expensive than finer fibers (i.e., having a smaller average diameter), and some coarser fibers impart a desirable compression strength to the separator. The design of any battery involves the balancing of a number of different properties, and results in a need for a separator having certain attributes, such as a particular mean pore size or wet tensile strength. Separators made from coarser fibers generally exhibit lower wet tensile strength and generally have a larger mean pore size than those made from finer fibers, all other factors being equal. Accordingly, a separator requiring certain characteristics such as a smaller mean pore size and/or higher wet tensile strength may demand the use of more expensive finer fibers.

In one aspect, the invention encompasses the insight that by controlling the density, a separator having certain attributes such as mean pore size and wet tensile strength can be achieved using a higher percentage of coarser fibers than was previously possible. In some embodiments, the density of the separator is controlled by employing densification in the process of making the separator.

In one aspect, the invention relates to a battery separator comprising glass fibers and having a basis weight (gsm), a specific surface area ($m^2/g$), a density (gsm/mm) and a mean pore size ($\mu m$), wherein the following equation ("eq. 1") is satisfied (when the quantities have the indicated units):

$$\text{mean pore size} < \left(\frac{270}{\text{basis weight}}\right)^{0.53} * \frac{1.6}{\text{specific surface area}} * \left(\frac{65}{\sqrt{\text{density}}} - 1.8\right)$$

provided that:
 the specific surface area is less than 1.5 $m^2/g$, or
 the density is greater than 180 gsm/mm.

It should be appreciated that eq. 1 is a relational equation, i.e., provided that the quantities inputted have the indicated units, as long as the numerical value of the right-hand side of the equation as written is greater than the left-hand side, the equation is satisfied. For example, if the numerical value of the right-hand side is 4.0, and the numerical value of the left-hand side is 3.5, then the equation is satisfied inasmuch as 3.5<4.0.

In one aspect, the invention relates to a battery separator comprising glass fibers and having a basis weight (gsm), a specific surface area (m²/g), a density (gsm/mm) and a mean pore size (μm), wherein eq. 1 is satisfied (when the quantities have the indicated units); provided that: the specific surface area is less than 1.5 m²/g, or the density is greater than 180 gsm/mm; wherein the separator is produced by a process described herein.

In one aspect, the invention relates to a lead-acid battery comprising a negative plate, a positive plate, and a battery separator disposed between the negative and positive plates; wherein the battery separator comprises glass fibers and has a basis weight (gsm), a specific surface area (m²/g), a density (gsm/mm) and a mean pore size (μm), wherein eq. 1 is satisfied (when the quantities have the indicated units); provided that: the specific surface area is less than 1.5 m²/g, or the density is greater than 180 gsm/mm.

In one aspect, the invention relates to a lead-acid battery comprising a negative plate, a positive plate, and a battery separator disposed between the negative and positive plates; wherein the battery separator comprises glass fibers and has a basis weight (gsm), a specific surface area (m²/g), a density (gsm/mm) and a mean pore size (μm), wherein eq. 1 is satisfied (when the quantities have the indicated units); provided that: the specific surface area is less than 1.5 m²/g, or the density is greater than 180 gsm/mm; wherein the separator is produced by a process described herein.

DETAILED DESCRIPTION OF CERTAIN EMBODIMENTS

Definitions

Figure 1:
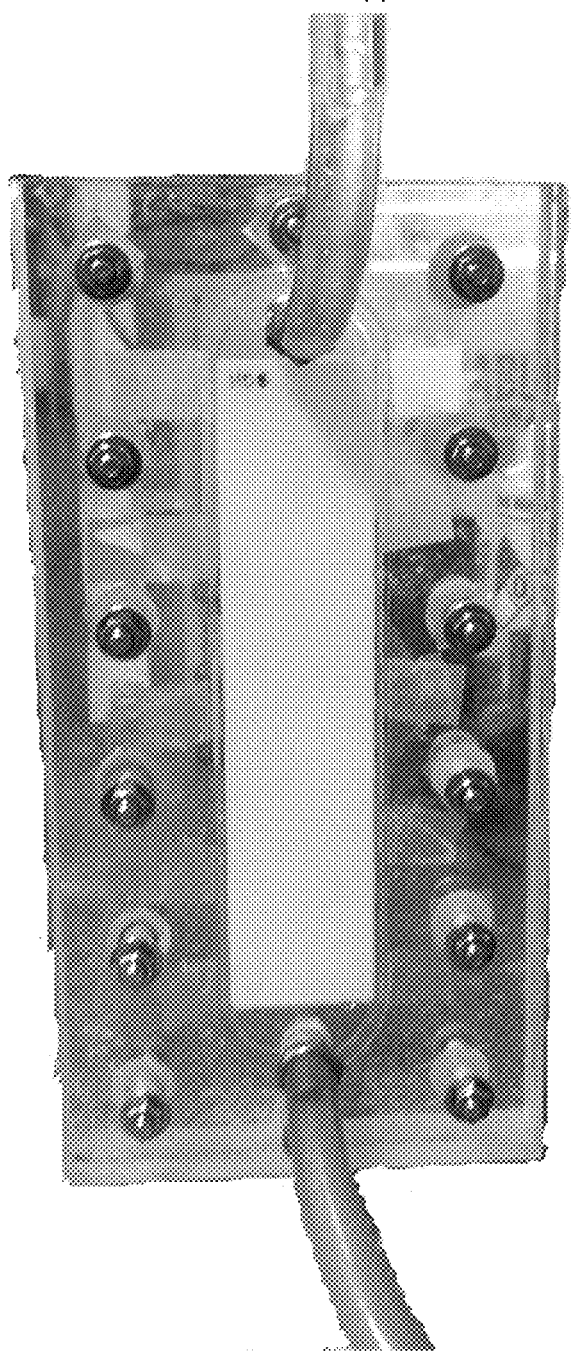
FIG. 1 shows an apparatus for use with the procedure described in Example 2.3: measurement of vacuum fill (acid filling) time.

Unless otherwise specified, when a value is stated to be "between" two endpoints or "from" one endpoint to another endpoint, the endpoints are intended to be included. For example, a value "between 2 and 20" or "from 2 to 20" includes both 2 and 20 as well as the values between.

Unless otherwise specified, the terms "include", "includes", "including", etc. are intended to be open-ended. That is, "including A and B" means including but not limited to A and B.

Amounts indicated as "% (w/w)" refer to percentage by weight.

Values of specific gravity are given with water at 4° C. as the reference.

Composition

In one aspect, the invention relates to a battery separator comprising glass fibers and having a basis weight (gsm), a specific surface area (m²/g), a density (gsm/mm) and a mean pore size (μm), wherein the following equation ("eq. 1") is satisfied (when the quantities have the indicated units):

$$\text{mean pore size} < \left(\frac{270}{\text{basis weight}}\right)^{0.53} * \frac{1.6}{\text{specific surface area}} * \left(\frac{65}{\sqrt{\text{density}}} - 1.8\right)$$

provided that:
the specific surface area is less than 1.5 m²/g, or
the density is greater than 180 gsm/mm.

In some embodiments, the specific surface area of the separator is less than 1.5 m²/g. In some embodiments, the density of the separator is greater than 180 gsm/mm.

In some embodiments, the separator comprises or is a part of a non-woven fiber web.

Fine Fibers

As used herein, "fine fibers" are fibers having an average diameter less than or equal to 1.0 μm. In some embodiments, the separator comprises from about 5% to about 50% (w/w) fine fibers. In some embodiments, the separator comprises from about 5% to about 45% (w/w) fine fibers. In some embodiments, the separator comprises from about 5% to about 40% (w/w) fine fibers. In some embodiments, the separator comprises from about 5% to about 35% (w/w) fine fibers. In some embodiments, the separator comprises from about 5% to about 30% (w/w) fine fibers. In some embodiments, the separator comprises from about 5% to about 25% (w/w) fine fibers. In some embodiments, the separator comprises from about 5% to about 20% (w/w) fine fibers. In some embodiments, the separator comprises from about 5% to about 15% (w/w) fine fibers.

In some embodiments, the separator comprises from about 10% to about 50% (w/w) fine fibers. In some embodiments, the separator comprises from about 15% to about 50% (w/w) fine fibers. In some embodiments, the separator comprises from about 20% to about 50% (w/w) fine fibers. In some embodiments, the separator comprises from about 25% to about 50% (w/w) fine fibers. In some embodiments, the separator comprises from about 30% to about 50% (w/w) fine fibers. In some embodiments, the separator comprises from about 35% to about 50% (w/w) fine fibers. In some embodiments, the separator comprises from about 40% to about 50% (w/w) fine fibers.

In some embodiments, the separator comprises from about 10% to about 45% (w/w) fine fibers. In some embodiments, the separator comprises from about 10% to about 40% (w/w) fine fibers. In some embodiments, the separator comprises from about 15% to about 45% (w/w) fine fibers. In some embodiments, the separator comprises from about 15% to about 40% (w/w) fine fibers. In some embodiments, the separator comprises from about 15% to about 35% (w/w) fine fibers. In some embodiments, the separator comprises from about 20% to about 40% (w/w) fine fibers. In some embodiments, the separator comprises from about 20% to about 35% (w/w) fine fibers. In some embodiments, the separator comprises from about 20% to about 30% (w/w) fine fibers. In some embodiments, the separator comprises from about 25% to about 35% (w/w) fine fibers.

In some embodiments, the fine fibers of the separator have an average diameter from about 0.05 to 1.0 μm. In some embodiments, the fine fibers of the separator have an average diameter from about 0.05 to about 0.9 μm. In some embodiments, the fine fibers of the separator have an average diameter from about 0.05 to about 0.8 μm. In some embodiments, the fine fibers of the separator have an average diameter from about 0.05 to about 0.7 µm. In some embodiments, the fine fibers of the separator have an average diameter from about 0.05 to about 0.6 µm. In some embodiments, the fine fibers of the separator have an average diameter from about 0.05 to about 0.5 µm. In some embodiments, the fine fibers of the separator have an average diameter from about 0.2 to 1.0 µm. In some embodiments, the fine fibers of the separator have an average diameter from about 0.3 to 1.0 µm. In some embodiments, the fine fibers of the separator have an average diameter from about 0.4 to 1.0 µm. In some embodiments, the fine fibers of the separator have an average diameter from about 0.5 to 1.0 µm. In some embodiments, the fine fibers of the separator have an average diameter from about 0.6 to 1.0 µm. In some embodiments, the fine fibers of the separator have an average diameter from about 0.2 to about 0.8 µm. In some embodiments, the fine fibers of the separator have an average diameter from about 0.3 to about 0.7 µm. In some embodiments, the fine fibers of the separator have an average diameter of less than or equal to 0.9 µm. In some embodiments, the fine fibers of the separator have an average diameter of less than or equal to 0.8 µm. In some embodiments, the fine fibers of the separator have an average diameter of less than or equal to 0.7 µm. In some embodiments, the fine fibers of the separator have an average diameter of less than or equal to 0.6 µm. In some embodiments, the fine fibers of the separator have an average diameter of less than or equal to 0.5 µm. In some embodiments, the fine fibers of the separator have an average diameter of less than or equal to 0.4 µm. In some embodiments, the fine fibers of the separator have an average diameter of less than or equal to 0.3 µm. In some embodiments, the fine fibers of the separator have an average diameter of less than or equal to 0.2 µm.

In some embodiments, the fine fibers of the separator are at least 5% (w/w), at least 10% (w/w), at least 15% (w/w), at least 20% (w/w), at least 25% (w/w), at least 30% (w/w), at least 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), at least 95% (w/w), or about 100% glass fibers.

Coarse Fibers

As used herein, "coarse fibers" are fibers having an average diameter greater than 1.0 µm. In some embodiments, the separator comprises from about 50% to about 95% (w/w) coarse fibers. In some embodiments, the separator comprises from about 50% to about 90% (w/w) coarse fibers. In some embodiments, the separator comprises from about 50% to about 85% (w/w) coarse fibers. In some embodiments, the separator comprises from about 50% to about 80% (w/w) coarse fibers. In some embodiments, the separator comprises from about 50% to about 75% (w/w) coarse fibers. In some embodiments, the separator comprises from about 50% to about 70% (w/w) coarse fibers. In some embodiments, the separator comprises from about 50% to about 65% (w/w) coarse fibers. In some embodiments, the separator comprises from about 50% to about 60% (w/w) coarse fibers.

In some embodiments, the separator comprises from about 55% to about 95% (w/w) coarse fibers. In some embodiments, the separator comprises from about 60% to about 95% (w/w) coarse fibers. In some embodiments, the separator comprises from about 65% to about 95% (w/w) coarse fibers. In some embodiments, the separator comprises from about 70% to about 95% (w/w) coarse fibers. In some embodiments, the separator comprises from about 75% to about 95% (w/w) coarse fibers. In some embodiments, the separator comprises from about 80% to about 95% (w/w) coarse fibers. In some embodiments, the separator comprises from about 85% to about 95% (w/w) coarse fibers.

In some embodiments, the separator comprises from about 55% to about 90% (w/w) coarse fibers. In some embodiments, the separator comprises from about 55% to about 85% (w/w) coarse fibers. In some embodiments, the separator comprises from about 60% to about 90% (w/w) coarse fibers. In some embodiments, the separator comprises from about 60% to about 85% (w/w) coarse fibers. In some embodiments, the separator comprises from about 60% to about 80% (w/w) coarse fibers. In some embodiments, the separator comprises from about 65% to about 85% (w/w) coarse fibers. In some embodiments, the separator comprises from about 65% to about 80% (w/w) coarse fibers. In some embodiments, the separator comprises from about 65% to about 75% (w/w) coarse fibers. In some embodiments, the separator comprises from about 70% to about 80% (w/w) coarse fibers.

In some embodiments, the coarse fibers of the separator have an average diameter of greater than or equal to 1.2 µm. In some embodiments, the coarse fibers of the separator have an average diameter from about 1.2 to about 50 µm. In some embodiments, the coarse fibers of the separator have an average diameter from about 1.2 to about 20 µm. In some embodiments, the coarse fibers of the separator have an average diameter from about 1.2 to about 15 µm. In some embodiments, the coarse fibers of the separator have an average diameter from about 1.2 to about 10 µm. In some embodiments, the coarse fibers of the separator have an average diameter from about 1.2 to about 7 µm. In some embodiments, the coarse fibers of the separator have an average diameter from about 1.2 to about 5 µm. In some embodiments, the coarse fibers of the separator have an average diameter from about 1.2 to about 4 µm. In some embodiments, the coarse fibers of the separator have an average diameter from about 1.2 to about 3 µm. In some embodiments, the coarse fibers of the separator have an average diameter from about 3 to about 20 µm. In some embodiments, the coarse fibers of the separator have an average diameter from about 3 to about 18 µm. In some embodiments, the coarse fibers of the separator have an average diameter from about 5 to about 15 µm. In some embodiments, the coarse fibers of the separator have an average diameter from about 7 to about 15 µm. In some embodiments, the coarse fibers of the separator have an average diameter from about 3 to about 12 µm. In some embodiments, the coarse fibers of the separator have an average diameter from about 5 to about 12 µm. In some embodiments, the coarse fibers of the separator have an average diameter from about 7 to about 12 µm. In some embodiments, the coarse fibers of the separator have an average diameter from about 5 to about 10 µm. In some embodiments, the coarse fibers of the separator have an average diameter from about 7 to about 9 µm. In some embodiments, the coarse fibers of the separator have an average diameter of greater than or equal to 2 µm. In some embodiments, the coarse fibers of the separator have an average diameter of greater than or equal to 3 µm. In some embodiments, the coarse fibers of the separator have an average diameter of greater than or equal to 5 µm. In some embodiments, the coarse fibers of the separator have an average diameter of greater than or equal to 7 µm.

In some embodiments, the coarse fibers of the separator are at least 5% (w/w), at least 10% (w/w), at least 15%

(w/w), at least 20% (w/w), at least 25% (w/w), at least 30% (w/w), at least 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), at least 95% (w/w), or about 100% glass fibers.

In some embodiments, the separator comprises polymeric fibers. In some embodiments, the coarse fibers of the separator are at least 5% (w/w), at least 10% (w/w), at least 15% (w/w), at least 20% (w/w), at least 25% (w/w), at least 30% (w/w), at least 35% (w/w) or at least 40% (w/w) polymeric fibers. The polymeric fibers may be in the form of staple fibers and/or synthetic pulp, and may be melted or partially melted, or may form a scrim.

Glass Fibers

In some embodiments, the glass fibers include microglass fibers, chopped strand glass fibers, or a combination thereof. Microglass fibers and chopped strand glass fibers are known to those skilled in the art. One skilled in the art is able to determine whether a glass fiber is microglass or chopped strand by observation (e.g., optical microscopy, electron microscopy). The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse.

Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures.

The microglass fibers can have small diameters such as less than 10.0 µm. For example, the average diameter of the microglass fibers in the separator—as opposed to the average diameter of all the glass fibers in the separator—can be between 0.1 µm to about 9.0 µm; and, in some embodiments, between about 0.3 µm and about 6.5 µm, or between about 1.0 µm and 5.0 µm. In certain embodiments, the microglass fibers can have an average fiber diameter of less than about 7.0 µm, less than about 5.0 µm, less than about 3.0 µm, or less than about 1.0 µm. In certain embodiments, the microglass fibers can be subjected to a rotary spinning process and have an average fiber diameter of between about 0.6 and about 10.0 µm, e.g., between about 0.8 and about 10.0 µm, between about 1.0 and about 10.0 µm, between about 3.0 and about 9.0 µm, between about 5.0 and about 8.0 µm, between about 6.0 and about 10.0 µm, or between about 7.0 and about 9.0 µm; or about 9.5 µm, about 9.0 µm, about 8.5 µm, about 8.0 µm, about 7.5 µm, about 7.0 µm, about 7.0 µm, about 6.5 µm, about 6.0 µm, about 5.5 µm, about 5.0 µm, about 4.5 µm, about 4.0 µm, about 3.5 µm, about 3.0 µm, about 2.5 µm, about 2.0 µm, or about 1.5 µm. Average diameter distributions for microglass fibers are generally log-normal. However, it can be appreciated that microglass fibers may be provided in any other appropriate average diameter distribution (e.g., Gaussian distribution, a distribution with a geometric standard deviation of twice the average diameter, etc.).

The microglass fibers can vary significantly in length as a result of process variations. The aspect ratios (length to diameter ratio) of the microglass fibers in a region can be generally in the range of about 100 to 10,000. In some embodiments, the aspect ratio of the microglass fibers in a region are in the range of about 200 to 2500; or, in the range of about 300 to 600. In some embodiments, the average aspect ratio of the microglass fibers in a region may be about 1,000; or about 300. It should be appreciated that the above-noted dimensions are not limiting and that the microglass fibers can also have other dimensions.

The chopped strand glass fibers can have an average fiber diameter that is greater than the diameter of the microglass fibers. In some embodiments, the chopped strand glass fibers have an average diameter of greater than about 5 µm. For example, the average diameter range can be up to about 30 µm. In some embodiments, the chopped strand glass fibers can have an average fiber diameter between about 5 µm and about 20 µm. In some embodiments, the chopped strand glass fibers can have an average fiber diameter between about 8 µm and about 20 µm. In some embodiments, the chopped strand glass fibers can have an average fiber diameter between about 10 µm and about 18 µm. In some embodiments, the chopped strand glass fibers can have an average fiber diameter between about 12 µm and about 16 µm. In some embodiments, the chopped strand glass fibers can have an average fiber diameter between about 5 µm and about 12 µm. In certain embodiments, the chopped strand fibers can have an average fiber diameter of less than about 10.0 µm, less than about 8.0 µm, less than about 6.0 µm. Average diameter distributions for chopped strand glass fibers are generally log-normal. However, it can be appreciated that chopped strand glass fibers can be provided in any appropriate average diameter distribution. In some embodiments, chopped strand glass fibers can have an average length greater than or equal to 1 mm. For example, in some embodiments, chopped strand glass fibers have an average length from about 1 mm to about 25 mm, about 3 mm to about 24 mm, about 3 mm to about 12 mm, about 3 mm to about 9 mm, about 6 mm, about 12 mm to about 24 mm, about 15 mm to about 21 mm, about 18 mm, about 3 mm to about 21 mm, about 6 mm to about 18 mm, about 9 mm to about 15 mm, or about 12 mm.

It should be appreciated that the above-noted dimensions are not limiting and that the microglass and/or chopped strand fibers can also have other dimensions.

In some embodiments, the glass fibers of the separator comprise a combination of chopped strand glass fibers and microglass fibers. In some embodiments, the glass fibers of the separator can comprise between about 0 weight percent to about 100 weight percent chopped strand glass fibers. For example, in some embodiments, the glass fibers of the separator comprise from about 0 weight percent to about 20 weight percent, from about 5 weight percent to about 20 weight percent, from about 5 weight percent to about 15 weight percent, from about 10 weight percent to about 15 weight percent, from about 20 weight percent to about 35 weight percent, from about 35 weight percent to about 50 weight percent, from about 50 weight percent to about 65 weight percent, from about 65 weight percent to about 80 weight percent, from about 80 weight percent to about 100 weight percent, from about 20 weight percent to about 60 weight percent, from about 40 weight percent to about 80 weight percent, or from about 60 weight percent to about 100 weight percent chopped strand glass fibers. In some embodiments, the glass fibers of the separator can comprise between about 0 weight percent to about 100 weight percent microglass fibers. For example, in some embodiments, the glass fibers of the separator comprise from about 80 weight percent to about 100 weight percent, from about 65 weight percent to about 80 weight percent, from about 50 weight percent to about 65 weight percent, from about 35 weight percent to about 50 weight percent, from about 20 weight percent to about 35 weight percent, from about 0 weight percent to about 20 weight percent, from about 40 weight percent to about 80 weight percent, from about 20 weight percent to about 60 weight percent, or from about 0 weight percent to about 40 weight percent microglass fibers.

Other Materials

Additionally, a separator can include a variety of other materials of construction. For example, the separator can include, in addition to glass fibers, non-glass fibers, natural fibers (e.g., cellulose fibers), synthetic fibers (e.g., polymeric), fibrillated fibers, binder resin, ceramic materials, solulizable fiber (e.g., polyvinyl alcohol soluble binder fiber) or any combination thereof. Additionally, the fibers can include thermoplastic binder fibers. Exemplary thermoplastic fibers include bi-component, polymer-containing fibers, such as sheath-core fibers, or side-by-side fibers. Examples of polymer fibers include polyalkylenes (e.g., polyethylene, polypropylene, polybutylene), polyesters (e.g., polyethylene terephthalate), polyamides (e.g., nylons, aramids), halogenated polymers (e.g., polytetrafluoroethylenes), and combinations thereof. Bicomponent fibers can be, e.g., from 0.1 to 15 decitex (weight in grams of 10,000 meters of fiber); can have a fiber length of e.g., 1-24 mm. In some embodiments, the separator contain between about 0 weight percent to about 30 weight percent of bicomponent fibers (e.g., between about 1% and about 15%, between about 1% and about 8%, between about 6% and about 8%, between about 6% and about 10%, between about 10% and about 15% or between about 10% and about 20%).

Separator Characteristics

As described above, in a separator of the invention, mean pore size (μm), the basis weight (gsm), the specific surface area (m²/g) and the density (gsm/mm) are related by the following equation ("eq. 1") (when the quantities have the indicated units):

$$\text{mean pore size} < \left(\frac{270}{\text{basis weight}}\right)^{0.53} * \frac{1.6}{\text{specific surface area}} * \left(\frac{65}{\sqrt{\text{density}}} - 1.8\right)$$

provided that:
the specific surface area is less than 1.5 m²/g, or
the density is greater than 180 gsm/mm.

Pore Size

The mean pore size is measured according to the Battery Council International Standard BCIS-03a (Rev September 09) method 6, "Pore Size Characteristics by the Liquid Porosimetry Method".

In some embodiments, the mean pore size can be less than 6 μm. For example, in some embodiments, the mean pore size is about 0.5 μm to about 5.5 μm, about 0.7 μm to about 5.3 μm, or about 1.0 μm to about 5.0 μm. In some embodiments in which the mean pore size is less than 6 μm, the maximum pore size is about 20 μm and the minimum pore size is about 0.1 μm. In some embodiments in which the mean pore size is less than 6 μm, the maximum pore size is about 17 μm and the minimum pore size is about 0.2 μm.

In some embodiments, the mean pore size can be less than 5 μm. For example, in some embodiments, the mean pore size is about 1.0 μm to about 4.5 μm, about 1.2 μm to about 4.3 μm or about 1.5 μm to about 4.0 μm. In some embodiments in which the mean pore size is less than 5 μm, the maximum pore size is about 15 μm and the minimum pore size is about 0.3 μm.

In some embodiments, the mean pore size can be less than 4 μm. For example, in some embodiments, the mean pore size is about 1.5 μm to about 3.9 μm, about 1.7 μm to about 3.9 μm, about 1.9 μm to about 3.9 μm about 2.1 μm to about 3.9 μm, about 2.3 μm to about 3.9 μm, about 2.5 μm to about 3.9 μm, about 1.5 μm to about 3.8 μm, about 1.5 μm to about 3.7 μm, about 1.5 μm to about 3.6 μm, about 1.5 μm to about 3.5 μm, about 1.7 μm to about 3.8 μm, about 1.9 μm to about 3.7 μm, about 2.1 μm to about 3.6 μm, about 2.3 μm to about 3.5 μm, about 2.4 μm to about 3.4 μm, about 2.4 μm to about 3.0 μm or about 2.7 μm to about 3.3 μm. In some embodiments in which the mean pore size is less than 4 μm, the maximum pore size is about 13 μm and the minimum pore size is about 0.4 μm.

Specific Surface Area

The specific surface area (BET) is measured according to method number 8 of Battery Council International Standard BCIS-03A (September 2009), "BCI Recommended Test Methods VRLA-AGM Battery Separators", method number 8 being "Surface Area". Following this technique, the BET specific surface area is measured via adsorption analysis using a BET surface analyzer (e.g., Micromeritics Gemini II 2370 Surface Area Analyzer) with nitrogen gas; the sample amount is between 0.5 and 0.6 grams in a ¾ inch tube; and, the sample is allowed to degas at 75° C. for a minimum of 3 hours.

In some embodiments, the specific surface area of the separator is less than 1.5 m²/g. For example, in some embodiments the specific surface area of the separator is about 0.1 m²/g to less than 1.5 m²/g, about 0.2 m²/g to less than 1.5 m²/g, about 0.3 m²/g to less than 1.5 m²/g, about 0.4 m²/g to less than 1.5 m²/g, about 0.5 m²/g to less than 1.5 m²/g, about 0.6 m²/g to less than 1.5 m²/g, about 0.7 m²/g to less than 1.5 m²/g, about 0.8 m²/g to less than 1.5 m²/g, about 0.9 m²/g to less than 1.5 m²/g, about 1.0 m²/g to less than 1.5 m²/g, about 1.1 m²/g to less than 1.5 m²/g, about 1.2 m²/g to less than 1.5 m²/g, about 1.3 m²/g to less than 1.5 m²/g, about 1.4 m²/g to less than 1.5 m²/g, about 1.0 m²/g to about 1.45 m²/g, about 1.0 m²/g to about 1.4 m²/g, about 1.0 m²/g to about 1.35 m²/g, about 1.0 m²/g to about 1.3 m²/g, about 1.1 m²/g to about 1.45 m²/g, about 1.15 m²/g to about 1.45 m²/g, about 1.2 m²/g to about 1.45 m²/g, about 1.25 m²/g to about 1.45 m²/g or about 1.3 m²/g to about 1.45 m²/g.

In some embodiments, namely, where the density of the separator is greater than 180 gsm/mm, the specific surface area of the separator can be, but need not be, greater than 1.5 m²/g. For example, in some embodiments the specific surface area of the separator is about 0.2 m²/g to about 2.5 m²/g, about 0.4 m²/g to about 2.5 m²/g, about 0.6 m²/g to about 2.5 m²/g, about 0.8 m²/g to about 2.5 m²/g, about 1.0 m²/g to about 2.5 m²/g, about 1.1 m²/g to about 2.5 m²/g, about 1.2 m²/g to about 2.5 m²/g, about 1.3 m²/g to about 2.5 m²/g, about 1.4 m²/g to about 2.5 m²/g, about 1.6 m²/g to about 2.5 m²/g, about 1.8 m²/g to about 2.5 m²/g, about 1.0 m²/g to about 2.4 m²/g, about 1.0 m²/g to about 2.2 m²/g, about 1.0 m²/g to about 2.0 m²/g, about 1.0 m²/g to about 1.8 m²/g, about 1.0 m²/g to about 1.6 m²/g, about 1.1 m²/g to about 2.4

$m^2/g$, about 1.15 $m^2/g$ to about 2.2 $m^2/g$, about 1.2 $m^2/g$ to about 2.0 $m^2/g$, about 1.25 $m^2/g$ to about 1.8 $m^2/g$, about 1.3 $m^2/g$ to about 1.6 $m^2/g$, about 0.2 $m^2/g$ to less than 1.5 $m^2/g$, about 0.4 $m^2/g$ to less than 1.5 $m^2/g$, about 0.6 $m^2/g$ to less than 1.5 $m^2/g$, about 0.8 $m^2/g$ to less than 1.5 $m^2/g$, about 1.0 $m^2/g$ to less than 1.5 $m^2/g$, or about 1.1 $m^2/g$ to less than 1.5 $m^2/g$.

Basis Weight

The basis weight, or grammage, is measured according to method number 3 "Grammage" of Battery Council International Standard BCIS-03A (Rev September 09) "BCI Recommended test Methods VRLA-AGM Battery Separators." In some embodiments, the basis weight of the separator can be from about 0.25 gsm (grams per square meter, or $g/m^2$) to about 2500 gsm.

For example, in some embodiments, the basis weight is from about 1 gsm to about 1500 gsm, about 4 gsm to about 1000 gsm, about 15 gsm to about 750 gsm, about 50 gsm to about 500 gsm, about 100 gsm to about 500 gsm, about 150 gsm to about 500 gsm, about 160 gsm to about 450 gsm, about 180 gsm to about 400 gsm, about 200 gsm to about 350 gsm, about 220 gsm to about 320 gsm, about 240 gsm to about 300 gsm, about 250 gsm to about 290 gsm, about 260 gsm to about 280 gsm, or about 270 gsm.

Thickness

The thickness is measured according to method number 12 "Thickness" of Battery Council International Standard BCIS-03A (Rev September 09) "BCI Recommended test Methods VRLA-AGM Battery Separators." This method measures the thickness with a 1 square inch anvil load to a force of 20 kPa. In some embodiments, the thickness of the separator can be from about 0.01 mm to about 15 mm. For example, in some embodiments the thickness of the separator is from about 0.05 mm to about 5 mm, about 0.1 mm to about 3 mm, about 0.1 mm to about 3.5 mm, about 0.15 mm to about 2 mm, about 0.15 mm to about 1.9 mm, about 0.15 mm to about 1.8 mm, about 0.15 mm to about 1.7 mm, about 0.2 mm to about 2 mm, about 0.3 mm to about 2 mm, about 0.4 mm to about 2 mm, about 0.5 mm to about 2 mm, about 0.6 mm to about 2 mm, about 0.7 mm to about 2 mm, about 0.8 mm to about 2 mm, about 0.9 mm to about 2 mm, about 1 mm to about 2 mm, about 1.1 mm to about 2 mm, about 1.2 mm to about 2 mm, about 1.3 mm to about 2 mm, about 1.1 mm to about 1.9 mm, about 1.2 mm to about 1.8 mm or about 1.3 mm to about 1.7 mm.

Density

The apparent density (referred to as "density" herein) of a separator is measured as the basis weight (grammage) of the separator in gsm (i.e., $g/m^2$) per unit thickness of the separator (e.g., in gsm/mm). In some embodiments, the density of the separator can be from about to about 75 gsm/mm to about 400 gsm/mm. For example, in some embodiments the density of the separator is from about 100 gsm/mm to about 350 gsm/mm, about 115 gsm/mm to about 300 gsm/mm, about 125 gsm/mm to about 300 gsm/mm, about 125 gsm/mm to about 250 gsm/mm, about 130 gsm/mm to about 240 gsm/mm, about 140 gsm/mm to about 225 gsm/mm, about 140 gsm/mm to about 210 gsm/mm, about 140 gsm/mm to about 200 gsm/mm, about 150 gsm/mm to about 220 gsm/mm, about 160 gsm/mm to about 220 gsm/mm, about 165 gsm/mm to about 210 gsm/mm, about 170 gsm/mm to about 205 gsm/mm, about 175 gsm/mm to about 200 gsm/mm, greater than 180 gsm/mm to about 350 gsm/mm, greater than 180 gsm/mm to about 300 gsm/mm, greater than 180 gsm/mm to about 300 gsm/mm, greater than 180 gsm/mm to about 250 gsm/mm, greater than 180 gsm/mm to about 240 gsm/mm, greater than 180 gsm/mm to about 225 gsm/mm, greater than 180 gsm/mm to about 210 gsm/mm, or greater than 180 gsm/mm to about 200 gsm/mm.

In some embodiments, the density of the separator is greater than 180 gsm/mm. For example, in some embodiments, the density of the separator is from greater than 180 gsm/mm to about 400 gsm/mm, greater than 180 gsm/mm to about 350 gsm/mm, greater than 180 gsm/mm to about 300 gsm/mm, greater than 180 gsm/mm to about 250 gsm/mm, about 182 gsm/mm to about 240 gsm/mm, about 182 gsm/mm to about 230 gsm/mm, about 182 gsm/mm to about 220 gsm/mm, about 182 gsm/mm to about 200 gsm/mm, about 184 gsm/mm to about 240 gsm/mm, about 184 gsm/mm to about 230 gsm/mm, about 184 gsm/mm to about 220 gsm/mm, about 184 gsm/mm to about 200 gsm/mm, about 186 gsm/mm to about 240 gsm/mm, about 186 gsm/mm to about 230 gsm/mm, about 186 gsm/mm to about 220 gsm/mm, about 186 gsm/mm to about 200 gsm/mm, about 188 gsm/mm to about 240 gsm/mm, about 188 gsm/mm to about 230 gsm/mm, about 188 gsm/mm to about 220 gsm/mm, about 188 gsm/mm to about 200 gsm/mm or about 185 gsm/mm to about 195 gsm/mm.

In some embodiments, a separator of the invention has the following characteristics:

the mean pore size is less than 6 μm, about 0.5 μm to about 5.5 μm, about 0.7 μm to about 5.3 μm, about 1.0 μm to about 5.0 μm, less than 5 μm, about 1.0 μm to about 4.5 μm, about 1.2 μm to about 4.3 μm, about 1.5 μm to about 4.0 μm, less than 4 μm, about 1.5 μm to about 3.9 μm, about 1.7 μm to about 3.9 μm, about 1.9 μm to about 3.9 μm about 2.1 μm to about 3.9 μm, about 2.3 μm to about 3.9 μm, about 2.5 μm to about 3.9 μm, about 1.5 μm to about 3.8 μm, about 1.5 μm to about 3.7 μm, about 1.5 μm to about 3.6 μm, about 1.5 μm to about 3.5 μm, about 1.7 μm to about 3.8 μm, about 1.9 μm to about 3.7 μm, about 2.1 μm to about 3.6 μm, about 2.3 μm to about 3.5 μm, about 2.4 μm to about 3.4 μm, about 2.4 μm to about 3.0 μm or about 2.7 μm to about 3.3 μm;

the basis weight is about 0.25 gsm to about 2500 gsm, about 1 gsm to about 1500 gsm, about 4 gsm to about 1000 gsm, about 15 gsm to about 750 gsm, about 50 gsm to about 500 gsm, about 100 gsm to about 500 gsm, about 150 gsm to about 500 gsm, about 160 gsm to about 450 gsm, about 180 gsm to about 400 gsm, about 200 gsm to about 350 gsm, about 220 gsm to about 320 gsm, about 240 gsm to about 300 gsm, about 250 gsm to about 290 gsm, about 260 gsm to about 280 gsm, or about 270 gsm;

the specific surface area is about 0.2 $m^2/g$ to about 2.5 $m^2/g$, about 0.4 $m^2/g$ to about 2.5 $m^2/g$, about 0.6 $m^2/g$ to about 2.5 $m^2/g$, about 0.8 $m^2/g$ to about 2.5 $m^2/g$, about 1.0 $m^2/g$ to about 2.5 $m^2/g$, about 1.1 $m^2/g$ to about 2.5 $m^2/g$, about 1.2 $m^2/g$ to about 2.5 $m^2/g$, about 1.3 $m^2/g$ to about 2.5 $m^2/g$, about 1.4 $m^2/g$ to about 2.5 $m^2/g$, about 1.6 $m^2/g$ to about 2.5 $m^2/g$, about 1.8 $m^2/g$ to about 2.5 $m^2/g$, about 1.0 $m^2/g$ to about 2.4 $m^2/g$, about 1.0 $m^2/g$ to about 2.2 $m^2/g$, about 1.0 $m^2/g$ to about 2.0 $m^2/g$, about 1.0 $m^2/g$ to about 1.8 $m^2/g$, about 1.0 $m^2/g$ to about 1.6 $m^2/g$, about 1.1 $m^2/g$ to about 2.4 $m^2/g$, about 1.15 $m^2/g$ to about 2.2 $m^2/g$, about 1.2 $m^2/g$ to about 2.0 $m^2/g$, about 1.25 $m^2/g$ to about 1.8 $m^2/g$, about 1.3 $m^2/g$ to about 1.6 $m^2/g$, about 0.2 $m^2/g$ to less than 1.5 $m^2/g$, about 0.4 $m^2/g$ to less than 1.5 $m^2/g$, about 0.6 $m^2/g$ to less than 1.5 $m^2/g$, about 0.8 $m^2/g$ to less than 1.5 $m^2/g$, about 1.0 $m^2/g$ to less than 1.5 $m^2/g$, or about 1.1 $m^2/g$ to less than 1.5 $m^2/g$; and the density is from greater than 180 gsm/mm to about 400 gsm/mm, greater than 180 gsm/mm to about 350 gsm/mm, greater than 180 gsm/mm to about 300 gsm/mm, greater than 180 gsm/mm to about 250 gsm/mm, about 182 gsm/mm to about 240 gsm/mm, about 182 gsm/mm to about 230 gsm/mm, about 182 gsm/mm to about 220 gsm/mm, about 182 gsm/mm to about 200 gsm/mm, about 184 gsm/mm to about 240 gsm/mm, about 184 gsm/mm to about 230 gsm/mm, about 184 gsm/mm to about 220 gsm/mm, about 184 gsm/mm to about 200 gsm/mm, about 186 gsm/mm to about 240 gsm/mm, about 186 gsm/mm to about 230 gsm/mm, about 186 gsm/mm to about 220 gsm/mm, about 186 gsm/mm to about 200 gsm/mm, about 188 gsm/mm to about 240 gsm/mm, about 188 gsm/mm to about 230 gsm/mm, about 188 gsm/mm to about 220 gsm/mm, about 188 gsm/mm to about 200 gsm/mm or about 185 gsm/mm to about 195 gsm/mm.

In some embodiments, a separator of the invention has the following characteristics:

the mean pore size is less than 6 µm, about 0.5 µm to about 5.5 µm, about 0.7 µm to about 5.3 µm, about 1.0 µm to about 5.0 µm, less than 5 µm, about 1.0 µm to about 4.5 µm, about 1.2 µm to about 4.3 µm, about 1.5 µm to about 4.0 µm, less than 4 µm, about 1.5 µm to about 3.9 µm, about 1.7 µm to about 3.9 µm, about 1.9 µm to about 3.9 µm about 2.1 µm to about 3.9 µm, about 2.3 µm to about 3.9 µm, about 2.5 µm to about 3.9 µm, about 1.5 µm to about 3.8 µm, about 1.5 µm to about 3.7 µm, about 1.5 µm to about 3.6 µm, about 1.5 µm to about 3.5 µm, about 1.7 µm to about 3.8 µm, about 1.9 µm to about 3.7 µm, about 2.1 µm to about 3.6 µm, about 2.3 µm to about 3.5 µm, about 2.4 µm to about 3.4 µm, about 2.4 µm to about 3.0 µm or about 2.7 µm to about 3.3 µm;

the basis weight is about 0.25 gsm to about 2500 gsm, about 1 gsm to about 1500 gsm, about 4 gsm to about 1000 gsm, about 15 gsm to about 750 gsm, about 50 gsm to about 500 gsm, about 100 gsm to about 500 gsm, about 150 gsm to about 500 gsm, about 160 gsm to about 450 gsm, about 180 gsm to about 400 gsm, about 200 gsm to about 350 gsm, about 220 gsm to about 320 gsm, about 240 gsm to about 300 gsm, about 250 gsm to about 290 gsm, about 260 gsm to about 280 gsm, or about 270 gsm;

the specific surface area of the separator is less than 1.5 m$^2$/g, about 0.1 m$^2$/g to less than 1.5 m$^2$/g, about 0.2 m$^2$/g to less than 1.5 m$^2$/g, about 0.3 m$^2$/g to less than 1.5 m$^2$/g, about 0.4 m$^2$/g to less than 1.5 m$^2$/g, about 0.5 m$^2$/g to less than 1.5 m$^2$/g, about 0.6 m$^2$/g to less than 1.5 m$^2$/g, about 0.7 m$^2$/g to less than 1.5 m$^2$/g, about 0.8 m$^2$/g to less than 1.5 m$^2$/g, about 0.9 m$^2$/g to less than 1.5 m$^2$/g, about 1.0 m$^2$/g to less than 1.5 m$^2$/g, about 1.1 m$^2$/g to less than 1.5 m$^2$/g, about 1.2 m$^2$/g to less than 1.5 m$^2$/g, about 1.3 m$^2$/g to less than 1.5 m$^2$/g, about 1.4 m$^2$/g to less than 1.5 m$^2$/g, about 1.0 m$^2$/g to about 1.45 m$^2$/g, about 1.0 m$^2$/g to about 1.4 m$^2$/g, about 1.0 m$^2$/g to about 1.35 m$^2$/g, about 1.0 m$^2$/g to about 1.3 m$^2$/g, about 1.1 m$^2$/g to about 1.45 m$^2$/g, about 1.15 m$^2$/g to about 1.45 m$^2$/g, about 1.2 m$^2$/g to about 1.45 m$^2$/g, about 1.25 m$^2$/g to about 1.45 m$^2$/g or about 1.3 m$^2$/g to about 1.45 m$^2$/g; and the density is about 75 gsm/mm to about 400 gsm/mm, about 100 gsm/mm to about 350 gsm/mm, about 115 gsm/mm to about 300 gsm/mm, about 125 gsm/mm to about 300 gsm/mm, about 125 gsm/mm to about 250 gsm/mm, about 130 gsm/mm to about 240 gsm/mm, about 140 gsm/mm to about 225 gsm/mm, about 140 gsm/mm to about 210 gsm/mm, about 140 gsm/mm to about 200 gsm/mm, about 150 gsm/mm to about 220 gsm/mm, about 160 gsm/mm to about 220 gsm/mm, about 165 gsm/mm to about 210 gsm/mm, about 170 gsm/mm to about 205 gsm/mm, about 175 gsm/mm to about 200 gsm/mm, greater than 180 gsm/mm to about 350 gsm/mm, greater than 180 gsm/mm to about 300 gsm/mm, greater than 180 gsm/mm to about 300 gsm/mm, greater than 180 gsm/mm to about 250 gsm/mm, greater than 180 gsm/mm to about 240 gsm/mm, greater than 180 gsm/mm to about 225 gsm/mm, greater than 180 gsm/mm to about 210 gsm/mm, or greater than 180 gsm/mm to about 200 gsm/mm.

Compressibility

Compressibility of a separator is measured according to Battery Council International Battery Technical Manual BCIS-03A (Rev. September 09) method number 1, "Compressibility and Recovery of Recombinant Battery Separator Material", and converted to % change in thickness of the separator (thickness measured before and after compression test). The compressibility of a separator can be expressed as percent compression, specifically, as the percent change in thickness of the separator on going from 10 kPa to 100 kPa (i.e., percent compression=((T@10 kPa−T@100 kPa)/T@10 kPa)*100, where T is the thickness at the indicated pressure). In some embodiments, the percent compression (dry) of the separator can be less than 31%. For example, in some embodiments the percent compression (dry) of the separator is less than 30%, less than 29%, about 20% to 31%, about 20% to about 30%, about 20% to about 29%, about 23% to 31%, about 23% to about 30%, about 23% to about 29%, about 25% to 31%, about 25% to about 30%, about 25% to about 29%, about 26% to 31%, about 26% to about 30% or about 26% to about 29%.

The compressibility of a separator can be also expressed as percent recovery, specifically, on going from 10 kPa to 100 kPa and back to 10 kPa as the percent retention of thickness at 20 kPa on the recovery cycle compared to the thickness at 20 kPa on the compression cycle (i.e., percent recovery=($T_{rec}/T_{comp}$)*100, where $T_{comp}$ is the thickness at 20 kPa on the compression cycle and $T_{rec}$ is the thickness at 20 kPa on the recovery cycle). In some embodiments, the percent recovery (dry) of the separator can be greater than 84%. For example, in some embodiments, the percent recovery (dry) of the separator is greater than 85%, greater than 86%, greater than 87%, about 84% to about 90%, about 85% to about 90%, about 86% to about 90%, about 87% to about 90%, about 84% to about 88%, about 85% to about 88% or about 86% to about 88%.

Measurements of percent compression and percent recovery for exemplary separators of the invention compared with reference separators are presented in Example 2.5.

Tensile Strength

Tensile strength of a separator is measured according to Battery Council International Battery Technical Manual BCIS-03A (Rev. September 09), method number 9, "Tensile Elongation & Strength". In some embodiments, the tensile strength (machine direction, MD) of the separator can be about 0.01 kN/m to about 50 kN/m. In some embodiments, the tensile strength (cross direction, CD) of the separator can be about 0.01 kN/m to about 25 kN/m.

For example, in some embodiments the tensile strength (MD) of the separator is about 0.01 kN/m to about 30 kN/m, about 0.01 kN/m to about 15 kN/m, about 0.01 kN/m to about 10 kN/m, about 0.01 kN/m to about 5 kN/m, about 0.01 kN/m to about 4 kN/m, about 0.01 kN/m to about 3 kN/m, about 0.01 kN/m to about 2 kN/m, about 0.1 kN/m to about 15 kN/m, about 0.1 kN/m to about 10 kN/m, about 0.1 kN/m to about 5 kN/m, about 0.1 kN/m to about 4 kN/m, about 0.1 kN/m to about 3 kN/m, about 0.1 kN/m to about 2 kN/m, about 0.17 kN/m to about 10 kN/m, about 0.17 kN/m to about 5 kN/m, about 0.17 kN/m to about 4 kN/m, about 0.17 kN/m to about 3 kN/m, about 0.17 kN/m to about 2 kN/m, about 0.3 kN/m to about 10 kN/m, about 0.3 kN/m to about 5 kN/m, about 0.3 kN/m to about 4 kN/m, about 0.3 kN/m to about 3 kN/m or about 0.3 kN/m to about 2 kN/m.

For example, in some embodiments the tensile strength (CD) of the separator is about 0.01 kN/m to about 15 kN/m, about 0.01 kN/m to about 7.5 kN/m, about 0.01 kN/m to about 5 kN/m, about 0.01 kN/m to about 2.5 kN/m, about 0.01 kN/m to about 2 kN/m, about 0.01 kN/m to about 1.5 kN/m, about 0.01 kN/m to about 1 kN/m, about 0.05 kN/m to about 7.5 kN/m, about 0.05 kN/m to about 5 kN/m, about 0.05 kN/m to about 2.5 kN/m, about 0.05 kN/m to about 2 kN/m, about 0.05 kN/m to about 1.5 kN/m, about 0.05 kN/m to about 1 kN/m, about 0.1 kN/m to about 5 kN/m, about 0.1 kN/m to about 2.5 kN/m, about 0.1 kN/m to about 2 kN/m, about 0.1 kN/m to about 1.5 kN/m, about 0.1 kN/m to about 1 kN/m, about 0.15 kN/m to about 5 kN/m, about 0.15 kN/m to about 2.5 kN/m, about 0.15 kN/m to about 2 kN/m, about 0.15 kN/m to about 1.5 kN/m or about 0.15 kN/m to about 1 kN/m.

Wet Tensile Strength

Wet tensile strength of a separator is measured according to the procedure described in Example 2.2. In some embodiments, the wet tensile strength (machine direction, MD) of the separator can be about 0.01 kN/m to about 20 kN/m. In some embodiments, the wet tensile strength (cross direction, CD) of the separator can be about 0.01 kN/m to about 10 kN/m.

For example, in some embodiments the wet tensile strength (MD) of the separator is about 0.01 kN/m to about 15 kN/m, about 0.01 kN/m to about 10 kN/m, about 0.01 kN/m to about 5 kN/m, about 0.01 kN/m to about 4 kN/m, about 0.01 kN/m to about 3 kN/m, about 0.01 kN/m to about 2 kN/m, about 0.01 kN/m to about 1 kN/m, about 0.05 kN/m to about 10 kN/m, about 0.05 kN/m to about 5 kN/m, about 0.05 kN/m to about 4 kN/m, about 0.05 kN/m to about 3 kN/m, about 0.05 kN/m to about 2 kN/m, about 0.05 kN/m to about 1 kN/m, about 0.1 kN/m to about 5 kN/m, about 0.1 kN/m to about 4 kN/m, about 0.1 kN/m to about 3 kN/m, about 0.1 kN/m to about 2 kN/m or about 0.1 kN/m to about 1 kN/m.

For example, in some embodiments the wet tensile strength (CD) of the separator is about 0.01 kN/m to about 5 kN/m, about 0.01 kN/m to about 4 kN/m, about 0.01 kN/m to about 3 kN/m, about 0.01 kN/m to about 2 kN/m, about 0.01 kN/m to about 1 kN/m, about 0.01 kN/m to about 0.5 kN/m, about 0.03 kN/m to about 3 kN/m, about 0.03 kN/m to about 2 kN/m, about 0.03 kN/m to about 1.5 kN/m, about 0.03 kN/m to about 1 kN/m, about 0.05 kN/m to about 2.5 kN/m, about 0.05 kN/m to about 2 kN/m, about 0.05 kN/m to about 1.5 kN/m, about 0.05 kN/m to about 1 kN/m or about 0.05 kN/m to about 0.5 kN/m.

Vacuum Fill (Acid Filling) Time

Vacuum fill (acid filling) time of a separator is measured according to the procedure described in Example 2.3. In some embodiments, the separator can exhibit a vacuum fill time of about 50 sec to about 500 sec.

For example, in some embodiments the separator exhibits a vacuum fill time of about 75 sec to about 450 sec, about 100 sec to about 400 sec, about 115 sec to about 360 sec, about 130 sec to about 310 sec, about 145 sec to about 295 sec or about 160 sec to about 280 sec.

Making a Separator

A separator of the invention can be produced using a wet laid or a dry laid process. In general, a wet laid process involves mixing together the fibers; for example, glass fibers (e.g., chopped strand and/or microglass) may be mixed together, optionally with any synthetic fibers, to provide a glass fiber slurry. In some cases, the slurry is an aqueous-based slurry. In certain embodiments, the microglass fibers, and optionally any chopped strand and/or synthetic fibers, are stored separately in various holding tanks prior to being mixed together. These fibers may be processed through a pulper before being mixed together. In some embodiments, combinations of chopped strand glass fibers, microglass fibers, and/or synthetic fibers are processed through a pulper and/or a holding tank prior to being mixed together. As discussed above, microglass fibers may include fine microglass fibers and coarse microglass fibers.

It should be appreciated that any suitable method for creating a glass fiber slurry may be used. In some cases, additional additives are added to the slurry to facilitate processing. The temperature may also be adjusted to a suitable range, for example, between 33° F. (0.5° C.) and 100° F. (38° C.), (e.g., between 50° F. (10° C.) and 85° F. (29° C.)). In some embodiments, the temperature of the slurry is maintained. In some cases, the temperature is not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 1.5% by weight.

In some cases, the pH of the glass fiber slurry may be adjusted as desired. For instance, the pH of the glass fiber slurry may range between about 1.5 and about 4.5, or between about 2.6 and about 3.2.

Before the slurry is sent to a headbox, the slurry may be passed through centrifugal cleaners for removing unfiberized glass or shot. The slurry may or may not be passed through additional equipment such as refiners or deflakers to further enhance the dispersion of the fibers. Fibers may then be collected on a screen or wire at an appropriate rate using any suitable machine, e.g., a fourdrinier, a rotoformer, a cylinder, an inclined wire fourdrinier, a gap former, a twin wire, a multiply former, a pressure former, a top former, etc.).

In some embodiments, the process involves introducing binder (and/or other components) into a pre-formed glass fiber layer. In some embodiments, as the glass fiber layer is passed along an appropriate screen or wire, different components included in the binder, which may be in the form of separate emulsions, are added to the glass fiber layer using a suitable technique. In some cases, each component of the binder resin is mixed as an emulsion prior to being combined with the other components and/or glass fiber layer. In some embodiments, the components included in the binder may be pulled through the glass fiber layer using, for example, gravity and/or vacuum. In some embodiments, one or more of the components included in the binder resin may be diluted with softened water and pumped into the glass fiber layer.

In other embodiments, a dry laid process is used. In a dry laid process, glass fibers are dispersed in air that is blown onto a conveyor, and optionally a binder is then applied. Dry laid processing is typically more suitable for the production of highly porous media including bundles of glass fibers.

Any method of densification of the separator can be employed at the appropriate stage in the process to obtain a separator having the desired characteristic (for example, pore size).

For example, in some embodiments, during the sheet forming process, as water is being drained from the stock slurry, the fibers can be drawn tightly together to densify the web through the use of vacuum applied by various elements of the papermachine forming section. These elements may include, papermachine table rolls, vacuum assisted or non-vacuum assisted hydrofoils, flatboxes, suction boxes, vacuum couch rolls, and/or other de-watering equipment commonly used in the paper industry. The amount of water to be drained may be variable depending on the level of densification desired in the end product. Vacuum imparted by this equipment may range between 0.5" and 30" of mercury. The use of a pressure forming head box may be employed to exert pressure on the stock slurry to assist with drainage and densification of the web being produced.

In some embodiments, the separator web being produced is physically pressed to effect densification.

In some embodiments, the pressing step occurs after the web is formed and has enough integrity to leave the forming section of the papermachine, passing between and being compressed by 2 press rolls prior to entering the dryer section. The press rolls may be unfelted or felted, to aid in water removal. Additionally, the rolls may be controlled at a fixed or unfixed gap setting.

In some embodiments, the pressing step is performed by a press roll while the sheet is still supported on the forming fabric, optionally over a vacuum element to assist water removal expelled by the pressing action. The pressing step may also be performed by a press roll positioned over a vacuum couch roll.

In some embodiments, pressing is achieved on the forming section of the papermachine through the use of a dandy roll where the sheet is supported by the forming fabric.

In some embodiments, pressing is achieved by a top wire dewatering system positioned above the forming fabric.

Each of the foregoing forms of pressure may employ fixed gap, unfixed gap, weight of the roll or equipment, pressure or force applied, driven or un-driven, use of vacuum or non-vacuum water removal.

The use of thickness measurement equipment may be used as part of a process control loop to provide feedback information to the pressing equipment to control the densification of the web being produced. The thickness measurement may be performed continuously as a part of the process control scanning equipment commonly used throughout the paper industry. The equipment may employ sensors that physically make contact with the web to detect web thickness. The thickness detection may also be made using laser measurement systems. The thickness detection devices may be held stationary over the web or may oscillate back and forth across the entire width of the web as it is produced. These systems may also be employed while the web is in the wet state before entering the drying process and/or after the web has been dried and prior to the papermachine reel section.

Any number of intermediate processes (e.g., calendering, laminating, etc.) and addition of additives may be utilized throughout the separator formation process. Additives can also be added either to the slurry or to the separator as it is being formed, including but not limited to, salts, fillers including silica, binders, and latex. In some embodiments, the additives may comprise between about 0% to about 30% by weight of the separator. Furthermore, the drying temperature may vary, also depending on the fiber composition. In various embodiments, the drying temperature may range from approximately 100° C. to approximately 700° C. The separator may comprise more than one layer, each layer optionally comprising different types of fibers with different physical and chemical characteristics.

Batteries

In one aspect, the invention relates to a lead-acid battery comprising a negative plate, a positive plate, and any battery separator described herein.

Thus, in one aspect, the invention relates to a lead-acid battery comprising a negative plate, a positive plate, and a battery separator disposed between the negative and positive plates, wherein the battery separator comprises glass fibers and has a basis weight (gsm), a specific surface area ($m^2/g$), a density (gsm/mm) and a mean pore size (μm), wherein the following equation (including the provisos, "eq. 1") is satisfied (when the quantities have the indicated units):

$$\text{mean pore size} < \left(\frac{270}{\text{basis weight}}\right)^{0.53} * \frac{1.6}{\text{specific surface area}} * \left(\frac{65}{\sqrt{\text{density}}} - 1.8\right)$$

provided that:

the specific surface area is less than 1.5 $m^2/g$, or the density is greater than 180 gsm/mm.

Figure 4:
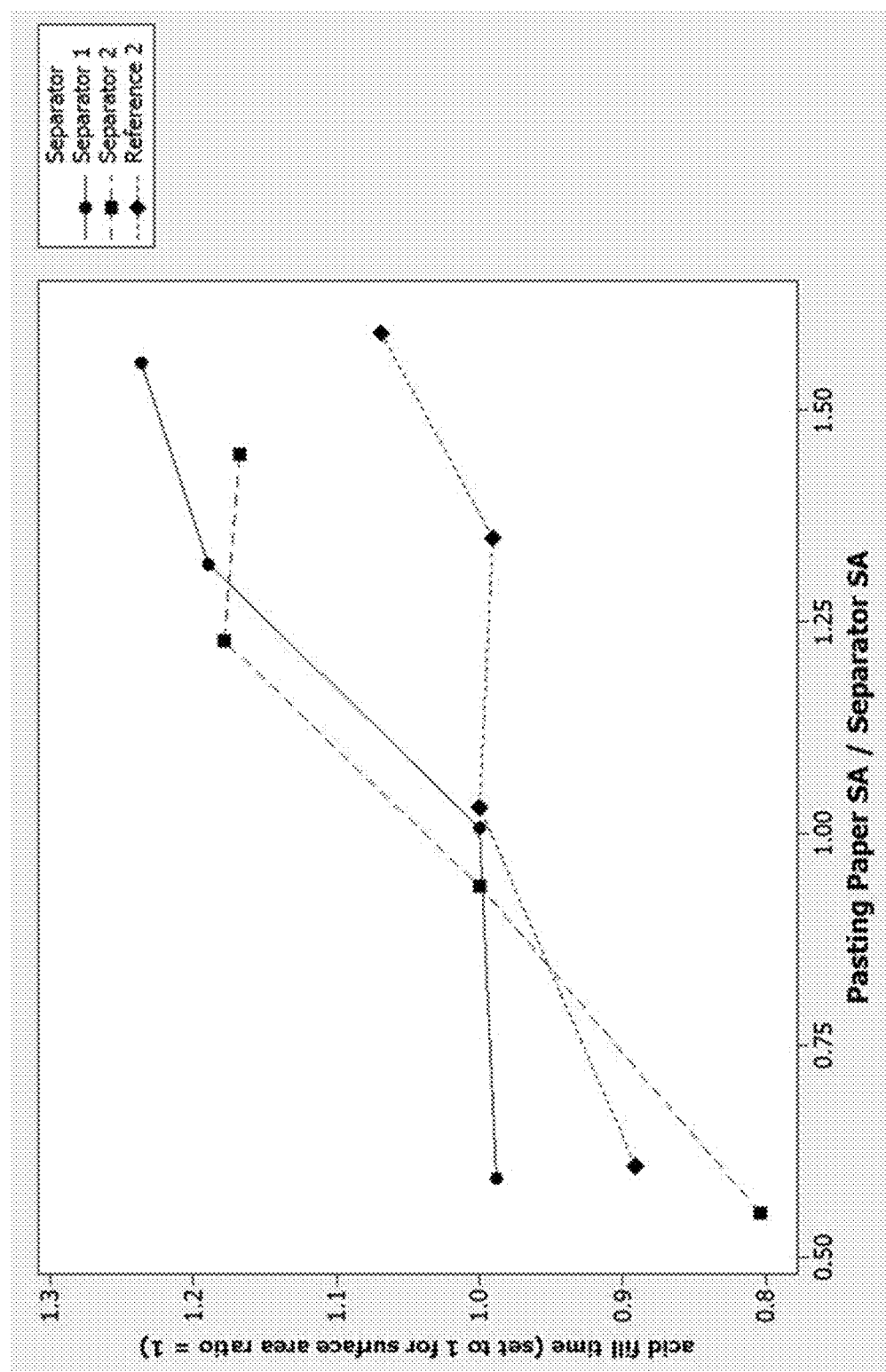
FIG. 4 illustrates the relationship between acid fill time and the ratio of specific surface area of pasting paper to separator as described herein.

The use of pasting paper in construction of lead-acid batteries is well known in the art. Pasting paper helps retain the active material paste in proximity to the grid prior to curing. However, the majority of pasting paper remains on the surface of the plate in contact with the separator, and therefore affects certain characteristics. In some embodiments, the present invention encompasses the insight that the ratio of the specific surface area of the pasting paper to the specific surface area of the separator affects certain properties such as acid filling time. The relationship between acid fill time and the ratio of specific surface area of pasting paper to separator is illustrated in FIG. 4 for two exemplary separators of the invention and one reference separator. In some embodiments, the invention relates to a lead-acid battery comprising a negative plate; a positive plate; a battery separator disposed between the negative and positive plates, wherein the battery separator comprises glass fibers and satisfies eq. 1; and pasting paper disposed between the battery separator and the negative and/or positive plate(s), wherein the ratio of the specific surface area of the pasting paper to the specific surface area of the separator is about 1.0 or less. For example, in some embodiments the ratio of the specific surface area of the pasting paper to the specific surface area of the separator is about 0.5 to about 1.0, about 0.6 to about 1.0, about 0.7 to about 1.0 or about 0.8 to about 1.0.

It is to be understood that the other components of the battery that are not explicitly discussed herein can be conventional battery components. Positive plates and negative plates can be formed of conventional lead acid battery plate materials. For example, in container formatted batteries, plates can include grids that include a conductive material, which can include, but is not limited to, lead, lead alloys, graphite, carbon, carbon foam, titanium, ceramics (such as Ebonex®), laminates and composite materials. The grids are typically pasted with active materials. The pasted grids are typically converted to positive and negative battery plates by a process called "formation." Formation involves passing an electric current through an assembly of alternating positive and negative plates with separators between adjacent plates while the assembly is in a suitable electrolyte.

As a specific example, positive plates contain lead as the active material, and negative plates contain lead dioxide as the active material. Plates can also contain one or more reinforcing materials, such as chopped organic fibers (e.g., having an average length of 0.125 inch or more), chopped glass fibers, metal sulfate(s) (e.g., nickel sulfate, copper sulfate), red lead (e.g., a $Pb_3O_4$-containing material), litharge, paraffin oil, and/or expander(s). In some embodiments, an expander contains barium sulfate, carbon black and lignin sulfonate as the primary components. The components of the expander(s) can be pre-mixed or not pre-mixed. Expanders are commercially available from, for example, Hammond Lead Products (Hammond, Ind.) and Atomized Products Group, Inc. (Garland, Tex.). An example of a commercially available expander is Texex® expander (Atomized Products Group, Inc.). In certain embodiments, the expander(s), metal sulfate(s) and/or paraffin are present in negative plates, but not positive plates. In some embodiments, positive plates and/or negative plates contain fibrous material or other glass compositions.

A battery can be assembled using any desired technique. For example, separators are wrapped around plates (e.g., cathode plates, anode plates). Positive plates, negative plates and separators are then assembled in a case using conventional lead acid battery assembly methods. In certain embodiments, separators are compressed before they are assembled in the case. In certain embodiments, separators are compressed after they are assembled in the case. An electrolytic mixture is then dispensed into the case.

In some embodiments, the electrolyte is sulfuric acid. In some embodiments, the specific gravity of the sulfuric acid is between 1.21 and 1.32, or between 1.28 and 1.31. In certain embodiments the specific gravity of the sulfuric acid is 1.26. In certain embodiments the specific gravity of the sulfuric acid is about 1.3.

EXAMPLES

Example 1. Separator Composition

In each of the separators described below, one or more of the following fibers are employed:

| Designation | Surface Area | Diameter |
|---|---|---|
| Fiber 1 | 2.1 m²/g | 0.8 μm |
| Fiber 2 | 1.45 m²/g | 1.4 μm |
| Fiber 3 | 0.62 m²/g | 2.6 μm |
| Fiber 4 | 0.1 m²/g | 14 μm |

Example 1.A. Reference Separator 1: of 60% Fiber 1/40% Fiber 3

Fiber 1 was added to a hydropulper containing water and sulfuric acid to form a fiber dispersion slurry. The pH was maintained at 2.7. The fiber slurry was stored in a chest (tank) under agitation. The same process was repeated for Fiber 3, and the fiber slurry thus prepared was stored in a second chest under agitation. The two chests supplied the slurries to the headbox of a paper machine (Fourdrinier). The flow rates of the respective slurries were set so that the dry weights of the fibers corresponded to 60% Fiber 1 and 40% Fiber 3. The fiber slurries were mixed within the head box creating a uniform fiber slurry which contacted a wire of the forming zone. The slurry was then dewatered using vacuum. The separator was then dried using steam heated drier cans. The separator was collected at the other end of the machine as sheets.

Example 1.B. Reference Separator 2: of 89% Fiber 2/11% Fiber 4

Using a procedure similar to that for Example 1.A, a single slurry chest was prepared using Fiber 2 and Fiber 4 at a weight ratio of 89% Fiber 2 to 11% Fiber 4. The chest supplied the slurry to the headbox of a paper machine (Fourdrinier), and sheets were made in the same manner as in Example 1.A.

Example 1.1. Separator 2: of 24% Fiber 1/61% Fiber 2/10% Fiber 3/5% Fiber 4

Using a procedure similar to that for Example 1.A, three chests of slurries were prepared. One contained 95% Fiber 1 and 5% Fiber 4, the second contained 95% Fiber 2 and 5% Fiber 4, and the third contained 95% Fiber 3 and 5% Fiber 4. These fibers slurries were supplied to the head box with the respective flows set to result in 24% Fiber 1, 61% Fiber 2, 10% Fiber 3, and 5% Fiber 4. After vacuum dewatering, but before drying, the web is passed through a wet press station which consists of an adjustable gap between a hard roll and a forming fabric. The density of the dry sheet is determined by measuring grammage and thickness, and the adjustable gap of the wet press is changed, either wider or narrower as needed, which changes the density of the resulting dry sheet. The gap was adjusted until the desired density target of 190 gsm/mm was met. Then the gap was set and the sheets were made in the same manner as in Example 1.A.

Example 1.2. Separator 1: of 24% Fiber 1/45% Fiber 2/26% Fiber 3/5% Fiber 4

Using the chests of slurries prepared for Example 1.1, the respective flow rates of the slurries were set to result in a combined dry weight of 24% Fiber 1, 45% Fiber 2, 26% Fiber 3, and 5% Fiber 4. The density of the separator was adjusted and sheets were made in the same manner as in Example 1.1.

Example 2. Separator Characteristics

Example 2.1

The following characteristics were determined for the separators of Example 1.

| Characteristic | Reference 1 | Reference 2 | Separator 1 | Separator 2 |
|---|---|---|---|---|
| basis weight (g/m²) | 278 | 260. | 277 | 275 |
| thickness @ 20 kPa (mm) | 1.63 | 1.49 | 1.46 | 1.45 |
| density @ 20 kPa (gsm/mm) | 171 | 175 | 190. | 190. |
| mean pore size (μm) | 3.09 | 4.00 | 3.28 | 2.69 |

-continued

| Characteristic | Reference 1 | Reference 2 | Separator 1 | Separator 2 |
|---|---|---|---|---|
| wet tensile strength, MD (kN/m) | 0.29 | 0.095 | 0.20 | 0.13 |
| surface area (m²/g) | 1.51 | 1.30 | 1.32 | 1.46 |

Example 2.2. Measurement of Wet Tensile Strength

Wet tensile strength of a separator can be measured according to the following procedure.
Equipment
Instron® Series 9 tensiometer (Norwood, Mass.)
Water Container
Stand Assembly with Clip for Hanging Sample
Sample Preparation
1. Wrap a length of polythene around the lower jaw mechanism of the tensiometer and seal with adhesive tape. (Ensure that lower mechanism is fully waterproofed.)
2. Wrap a length of absorbent sheet around the base of the tensiometer. (Ensure that excess water is captured or contained.)
3. Ensure the distance between the jaws is set at 100 mm.
4. Set up the "Wet tensile" (50×100 mm) test from the software menu.
5. Part-fill a shallow container with deionized water and set up a stand to hang a sample over it. (Container must completely accommodate a 200 mm-length sample.)
6. Cut a 150×50 mm sample in the machine- or cross-direction.
Sample Testing
7. Ensure the sample is identified as MD (machine direction) or CD (cross direction).
8. Immerse the sample completely in the deionized water for 1 minute.
9. Remove the sample and hang, allowing excess water to drip off, for 30 seconds.
10. Place the sample in the tensiometer and run a tensile test.
11. Record tensile strength (kN/m).

Example 2.3. Measurement of Vacuum Fill (Acid Filling) Time

Vacuum fill (acid filling) time of a separator can be measured according to the following procedure. Measurements of acid filling time were made for Reference separator 1 and Example Separators 1 and 2:

| | |
|---|---|
| Reference 1 | 220 sec |
| Separator 2 | 250 sec |
| Separator 1 | 178 sec |

Equipment
1.26 s.g. (specific gravity) sulfuric acid
Sample(s) to be tested
8"×1.9375" sample strip
12"×6"×1" Perspex blocks, with holes drilled for attaching and inlet/outlet barbs for acid filling
Screw-thread, nuts and washers
Shims, various thicknesses, for the required gap
Rubber gasket or O-ring cord for 'sealing' the sample
Acid feed assembly (Glassware with tubing), including stand and clamps
Vacuum pump
Timer/stopwatch
Sample Preparation
1. Measure the grammage of the separator, to one decimal point, in g/m² (W).
2. Calculate the required thickness for each density value:
 2.1. Thickness=grammage÷compressed density (typically 220 gsm/mm).
3. Determine the shims and o-ring cords required for each thickness calculated:
 3.1. Shims should be to the nearest available thickness increment.
 3.2. O-ring cord diameter should be equal to, or greater than, the shim thickness, but no more than 0.5 mm greater.
4. Cut the sample 8"×1.9375" in the machine direction.
5. Weigh the sample to determine the amount of acid needed.
6. Put the bolts through the Perspex base and lay the assembly on the bench.
7. Place the sample on the Perspex base in between the grooves on the plate.
8. Align the rubber gasket on the edges of the separator in the grooves on the plate.
9. Put the required shims onto each bolt.
10. Add the Perspex face to the top of this assembly and finger-tighten the nuts.
11. Tighten the nuts using the torque wrench (set at 10 N). (refer to FIG. 1.)
Sample Testing
12. Connect vacuum pump to the outlet barb.
13. Stand the block upright and plug in the acid feed assembly.
14. Add the appropriate amount of acid to the top of the feed system. Make sure the valve is closed.
15. Turn the vacuum pump on and allow system to come to equilibrium at 500 mm Hg.
16. When the system has come to equilibrium at 500 mm Hg, open up the valve to the acid and record the acid front travel time required to complete filling of the sample.

Example 2.4. Measurement of Acid Stratification Distance

This Method is Used to Determine the Degree to which Sulfuric Acid Displaces Water in a glass-mat separator while under compression. The measured stratification distance can provide an indication of potential stratification within a battery cell, a phenomenon in which the specific gravity of the electrolyte (acid) varies throughout the height of the cell.
Equipment
Methyl red, diluted in 1.28 s.g. (specific gravity) sulfuric acid (1:100 dilution)
1.1 s.g. (specific gravity) sulfuric acid
Sample(s) to be tested
300×150×50 mm Perspex blocks, with holes drilled for attaching
Screw-thread, nuts and washers
Shims, various thicknesses, for the required gap
Rubber gasket or O-ring cord, various diameters, for 'sealing' the sample
Pyrex dish to hold block assembly and acid
Sample Preparation
1. Measure the grammage of the separator, to one decimal point, in g/m² (W).
2. Measurements of acid stratification distance are typically made at about 200 g/m²/mm compressed density and/or about 240 g/m²/mm compressed density.

Figure 3:
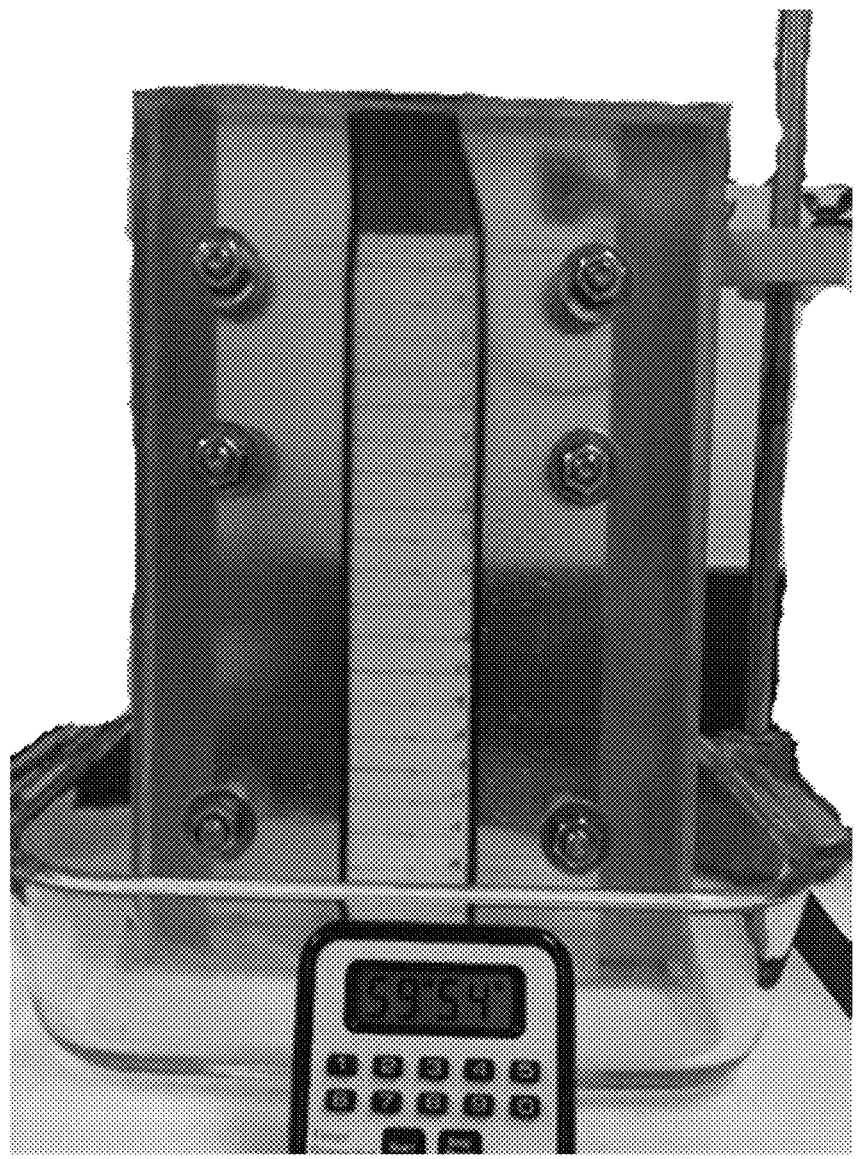
FIG. 3 shows an apparatus for use with the procedure described in Example 2.4: measurement of acid stratification distance.

3. Calculate the required thickness for each density value:
  3.1. Thickness=grammage÷compressed density (either 200 or 240).
4. Determine the shims and o-ring cords required for each thickness calculated:
  4.1. Shims should be to the nearest available thickness increment.
  4.2. O-ring cord diameter should be equal to, or greater than, the shim thickness, but no more than 0.5 mm greater.
5. Cut two samples of separator, 250×50 mm, in the machine direction.
6. Immerse the sample in 1.1 s.g. acid for one minute.
7. Put the bolts through the Perspex base and lay the assembly on the bench.
8. Place wet sample on the Perspex base.
9. Align the o-ring cords tight to the edges of the separator.
10. Put the required shims onto each bolt.
11. Add the Perspex face to the top of this assembly and finger-tighten the nuts.
12. Push the o-ring cords tightly to the sample edge all along the AGM, particularly at the top.
13. Tighten the nuts using the torque wrench (set at 10 Nm/88.5 in/lbf).
  (refer to FIG. 3.)
Sample Testing
14. Put the full block in an empty Pyrex dish with a 20 mm 1.1 s.g. acid level.
15. Add dyed sulfuric acid (1.28 s.g.) into the space at the top of the sample and start the timer (60-minute countdown).
16. The acid will travel or diffuse through the pores of the separator and a visual red/pink 'tide mark' will be observed, displaying the magnitude of displacement.
17. Check the status of the displacement at regular intervals (every 15 minutes is sufficient).
18. After the 60 minutes is completed, measure the total acid displacement (distance from the top of the sample to the red/pink mark).
19. Report acid stratification distance, at each density measured in mm.

Example 2.5. Measurement of Compressibility

Figure 2:
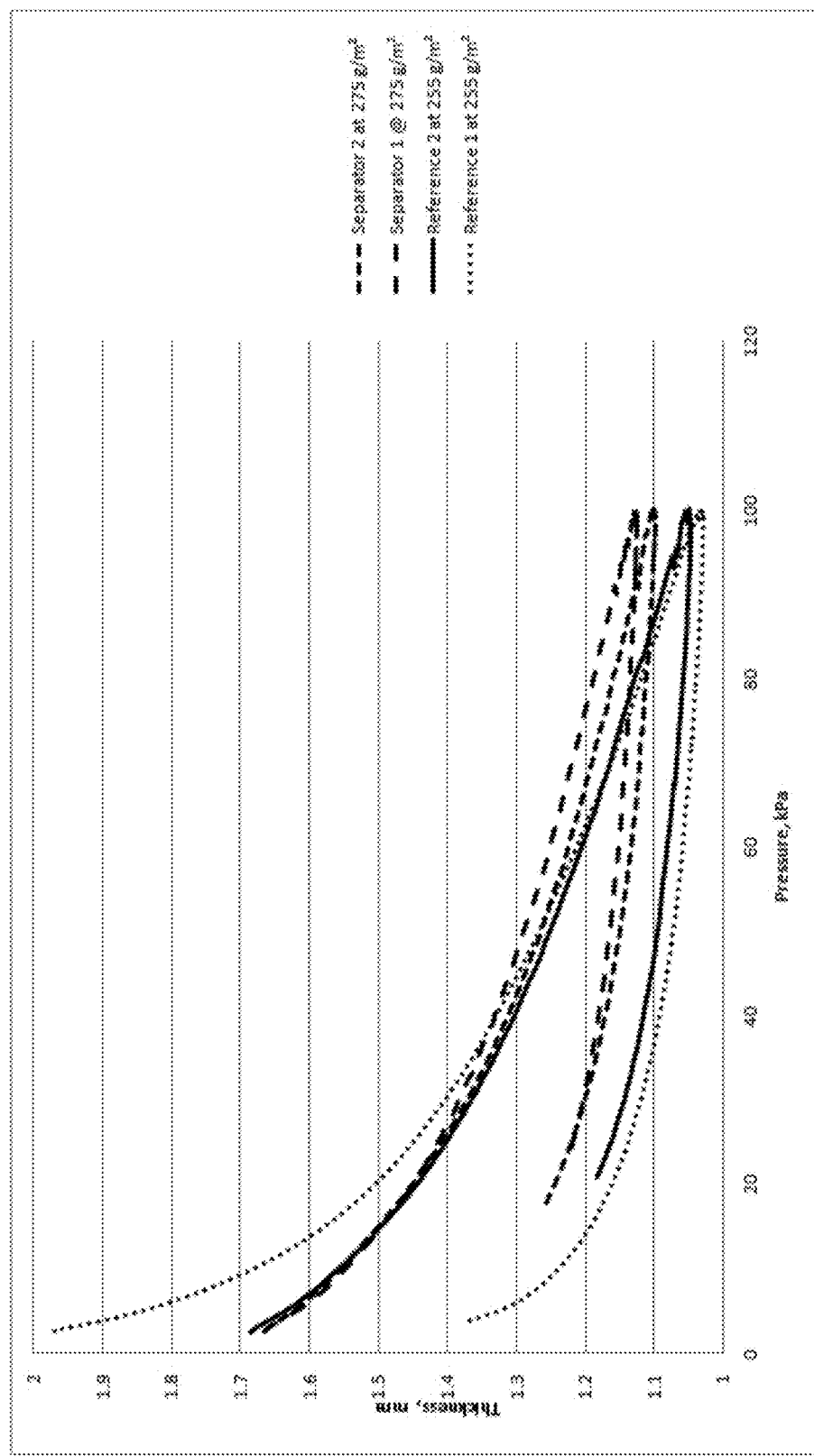
FIG. 2 shows a compression/recovery graph as described in Example 2.5.

Percent compression and percent recovery of exemplary Separators 1 and 2 and Reference separators 1 and 2 were measured as described above under "Compressibility", with reference to BCIS-03A (Rev. September 09) method number 1. Results are shown in FIG. 2 and in the table below.

| Separator | Percent compression (10 kPa to 100 kPa) | Percent recovery (20 kPa) |
| --- | --- | --- |
| Reference 1 | 39.4 | 77 |
| Reference 2 | 31.8 | 83.1 |
| Separator 1 | 26.6 | 87.5 |
| Separator 2 | 28.6 | 87.5 |

What is claimed is:

1. A battery separator comprising fibers, wherein the fibers comprise at least 5% glass fibers, and having a basis weight (in gsm), a specific surface area (in m$^2$/g), a density (in gsm/mm) and a mean pore size (in μm), wherein the following equation is satisfied:

$$\text{mean pore size} < \left(\frac{270}{\text{basis weight}}\right)^{0.53} * \frac{1.6}{\text{specific surface area}} * \left(\frac{65}{\sqrt{\text{density}}} - 1.8\right)$$

provided that:
  the specific surface area is greater than 0.8 m$^2$/g and less than 1.50 m$^2$/g, the basis weight is greater than or equal to about 150 gsm, and the density is greater than 180 gsm/mm,
  wherein the battery separator has a percent compression of less than 31% when measured according to Battery Council International Battery Technical Manual BCIS-03 (Rev. September 09) method number 1, and
  wherein the percent compression is equal to ((T@ 10 kPa−T@100 kPa)/T@ 10 kPa)*100% wherein T@ 10 kPa is a thickness of the battery separator at 10 kPa and wherein T@100 kPa is a thickness of the battery at 100 kPa.

2. The battery separator of claim 1, wherein the fibers comprise about 5% to about 50% fibers having an average diameter less than or equal to 1.0 μm.

3. The battery separator of claim 2, wherein the fibers comprise about 15% to about 35% fibers having an average diameter less than or equal to 1.0 μm.

4. The battery separator of claim 1, wherein the mean pore size is less than 6 μm.

5. The battery separator of claim 4, wherein the mean pore size is less than 5 μm.

6. The battery separator of claim 4, wherein the mean pore size is less than 4 μm.

7. The battery separator of claim 1, wherein the density is from greater than 180 gsm/mm to about 400 gsm/mm.

8. The battery separator of claim 7, wherein the density is from greater than 180 gsm/mm to about 220 gsm/mm.

9. The battery separator of claim 1, wherein the wet tensile strength (MD) of the separator is about 0.01 kN/m to about 20 kN/m.

10. The battery separator of claim 9, wherein the wet tensile strength (MD) of the separator is about 0.1 kN/m to about 3 kN/m.

11. The battery separator of claim 1, wherein the wet tensile strength (CD) of the separator is about 0.01 kN/m to about 10 kN/m.

12. The battery separator of claim 11, wherein the wet tensile strength (CD) of the separator is about 0.05 kN/m to about 1.5 kN/m.

13. The battery separator of claim 1, wherein the percent recovery is greater than 84% when measured according to Battery Council International Battery Technical Manual BCIS-03A (Rev. September 09) method number 1.

14. The battery separator of claim 1, wherein the basis weight is between 150 gsm and 1000 gsm.

15. The battery separator of claim 1, wherein the basis weight is from about 150 gsm to about 500 gsm.

16. The battery separator of claim 1, wherein the basis weight is greater than or equal to about 160 gsm.

* * * * *